UNITED STATES PATENT OFFICE 2,571,319

PRODUCTION OF COLORED FILAMENTS AND FIBERS

Edmund Waters and Leonard Wood, Blackley, Manchester, England, assignors to Imperial Chemical Industries Limited, a corporation of Great Britain No Drawing. Application November 25, 1949, Serial No. 129,509. In Great Britain December 3, 1948

12 Claims. (Cl. 18—54)

This invention relates to the production of coloured filaments and fibres and more particularly to the production of coloured filaments and fibres from polyethylene terephthalate.

Polyethylene terephthalate, which should perhaps be called polymeric ethylene terephthalate in order to be more technically correct, is a high-melting, difficultly-soluble colourless or substantially colourless material which can be formed into filaments, which filaments can be extended by drawing to form strong flexible fibres showing by characteristic X-ray patterns, molecular orientation along the fibre axis. The fibres so obtained are outstandingly useful for textile purposes but they do not readily absorb aqueous liquids and they have poor affinity for dyestuffs and accordingly considerable difficulties are experienced in satisfactorily colouring the fibres.

It has already been disclosed in British Specification No. 504,714 that delustred fibres, films, ribbons, bristles and other shaped articles from synthetic superpolymers, i. e. synthetic linear polymers which have the ability to form fibres, including polyesters, may be formed by spinning or otherwise shaping a synthetic superpolymer containing interspersed therein a finely divided substance which is insoluble in and has a different refractive index from the superpolymer, and thereafter, if desired, cold-drawing said shaped articles. It is disclosed in said specification that the finely divided substances may be added to the molten superpolymer in solid state, or in the form of a solution or suspension and then precipitated by removal of the solvent, or that they may be included in the parent monomeric substance or substances employed in the synthesis of the superpolymers.

Among the insoluble finely divided substances which could be used there were mentioned coloured substances such as carbon black, copper phthalocyanine pigment, lead chromate, iron oxide, chromium oxide and ultramarine blue.

When, however, such finely divided substances are introduced into polyethylene terephthalate and the polyethylene terephthalate is spun into fibers, it is found that the finely divided substance shows a remarkable tendency to form aggregates within the fibre so that the finely divided substance is not uniformly distributed in the fibre and the depth of shade obtained is relatively low.

Various processes have been proposed with the object of mitigating this defect. For example, in British Specification No. 610,137 it has been proposed to add the insoluble pigment in the form of a dispersion in ethylene glycol to a mixture of polyester-forming reactants or to a low molecular weight product formed therefrom, and thereafter to effect or continue the polyester-forming reaction until polyethylene terephthalate in a highly polymerised condition suitable for forming into fibres is obtained. It will be apparent that in such a process from each lot of polyethylene terephthalate formed in the polymerisation vessel, fibres of only one shade can be obtained and in some circumstances, for example when polymerisation is effected in large batches, or by a continuous process, this may be a serious disadvantage. Also in British Specification No. 596,688 it has been proposed to add to molten polyethylene terephthalate, an insoluble pigment in the form of a dispersion in a different linear polyester or in a linear polyester-amide. It will be apparent that in such a process the addition of the different linear polyester linear polyester-amide will modify the properties of polyethylene terephthalate, for example by lowering the melting point, and when the polyethylene terephthalate is to be used for some purposes, this modification of properties may be undesirable.

We have now found that polyethylene terephthalate can be satisfactorily and uniformly coloured without the disadvantages which accompany the aforementioned processes if instead of using an insoluble pigment, there is used an organic colouring matter which is soluble in the polyethylene terephthalate at the temperature of the spinning process and which is stable at the temperature of the spinning process. By the use of such a colouring matter it is possible to obtain polyethylene terephthalate fibres which are more uniformly coloured and, if desired, more intensely coloured than those obtainable by any hitherto known process.

According to our invention we provide a process for the production of coloured filaments and fibres which comprises spinning polyethylene terephthalate which contains dissolved therein an organic colouring matter which is stable at the temperature of the spinning process.

By the process of our invention the colouring of polyethylene terephthalate is easily controlled. Problems due to variation of particle size, for example variation in shade, are eliminated, and a uniform distribution of colors is obtained by the rapid diffusion of the colouring material through the molten polymer. Dyestuffs which will not diffuse readily into the polymer from aqueous liquids at 100° C., are readily incorporated by the process of our invention to give dyeings of excellent fastness to light, washing and rubbing. Also in fibres coloured by the process of our invention there is little or no tendency for the dyestuff to migrate to the surface of the polymer, which tendency is generally found in polymeric materials other than polyethylene terephthalate and which gives rise to poor rubbing fastness.

The organic colouring matter used should preferably be one which under the conditions used in the spinning process, causes no appreciable degradation of the polyethylene terephthalate, that is to say the intrinsic viscosity of the polyethylene terephthalate which has been melted in the spinning apparatus in the presence of the colouring matter should not be markedly different from that which has been melted in the spinning apparatus in the absence of the colouring matter. We have found that change in melt viscosity is a very sensitive measure of the degradation of polyethylene terephthalate and measurement of melt viscosity accordingly offers a very suitable test for such degradation. The suitability of any particular colouring matter for use in the process can be readily determined by the following tests:

One part by weight of the colouring matter (or other suitable quantity to give the required degree of colouration) is mixed with 200 parts by weight of polyethylene terephthalate, having a viscosity of 2000 to 3000 poises at 278° C., in the form of small chips. Care must be taken to mill the mixture sufficiently to ensure even distribution of the colour. The mixture is divided into two parts (samples 1 and 2) which are placed in glass tubes and dried at 180° C., for 2 hours under a vacuum of 1 mm. or less. The vacuum is then released with dry nitrogen and the tubes are sealed. One of the portions (sample 2) is then heated at 275° C., for 30 minutes.

The tubes are cooled and broken and the glass is removed. A portion of each of the samples 1 and 2 is made into a film by sandwiching it between sheets of aluminium foil (coated with suitable moulding lubricant) approximately two thousandths of an inch thick and of a suitable area to include the final film. The sandwich is placed between the preheated platens of a hydraulic press at 270° C., for one minute. Pressure up to 50 tons per square inch is then applied for one minute. The sandwich is removed as quickly as possible and immediately quenched in cold water. The resulting film can then be detached from the aluminium foil.

There should be no appreciable difference of hue or intensity of colour between the films obtained from samples 1 and 2 (criterion A). A section of the film from sample 2 is viewed under a microscope at 250 × magnification. The film should be clear, homogeneously coloured, and free from visible particles of colouring matter (criterion B).

A mixture of polyethylene terephthalate and the requisite quantity of colouring matter is dried and heated to 278° C., in a small test tube. When a homogeneous molten mixture is obtained the viscosity is determined according to the method of Flory (Journal of the American Chemical Society, 1948, page 2384, and 1940, page 1057). After remaining in the molten state for half an hour the viscosity should not be less than 1000 poises (criterion C).

In general it is found that if criteria A and B are satisfied, the colouring matter will not lead to degradation of the polymer (criterion C) and polymer containing the colouring matter can be spun satisfactorily under a wide range of physical conditions.

The following is a description of one example of the full testing procedure 1 gram of purified Durindone Scarlet Y (Schultz Farbstoff Tabellen No. 1356) and 200 grams of polyethylene terephthalate powder which passed a 30 mesh sieve were introduced into a bottle of 500 cc. capacity. To ensure complete mixing of the dyestuff and polymer, the bottle was tightly corked and placed in a machine for half an hour, which tumbled the polymer from end to end of the bottle 120 times per minute.

Two portions (samples 1 and 2) were taken from this mixture and dried as described above. Sample 2 was further heated at 275° C. for 30 minutes.

Films were then made from the samples 1 and 2 as described above. There was no appreciable difference of hue or intensity of colour between the two films. A section of the film from sample 2 was examined microscopically at 250 × magnification. The film was clear and homogeneously coloured and no visible particles of colour were present.

1 gram of a polymer/colour mixture prepared as above was placed in a clean dry test tube 22 x 1 cms. fitted with a sidearm 1 inch from the open end. After being tightly stoppered the tube was placed in a cyclo-hexanol vapour bath (160° C.) where it was evacuated and flushed several times with pure dry nitrogen. The tube was then again evacuated and the mixture dried for 4 hours at 0.01 mm. of mercury pressure. It was then allowed to cool to room temperature and the vacuum was released with pure dry nitrogen. The rubber bung used to seal the tube during drying was removed, and a centrally bored bung containing a weighed capillary tube (1.8 mms. bore) substituted. The tube was finally fixed in a vapour bath containing boiling acenaphthene (B. P. 278° C.).

The time at which the mixture became completely molten was noted (this was recorded as the zero time of the experiment). The capillary tube was then adjusted, so that it was co-axial with the test tube and its end was 0.5 cm. below the surface of the molten solution.

After 30 minutes from the zero time the sidearm of the test tube was connected to an aspirator containing nitrogen by means of a two-way tap and the pressure of nitrogen in the aspirator read on a mercury manometer. The time flow of the molten material along a 2 cms. length of the capillary was measured with a stop watch.

The capillary tube was then removed from the apparatus; the molten polymer adhering to the outside quickly wiped off with a clean rag, and the tube was cooled to room temperature and weighed. The weight of polymer in the capillary tube was thus obtained. The volume of the molten polymer was calculated, and hence the density was obtained.

The viscosity of the molten material was then calculated from the equations:

$$Vm = P \cdot G \cdot C$$

where $Vm$ = melt viscosity in poises.
$P$ = corrected pressure in mm. of mercury
$G$ = time of flow in seconds.

$$C = \frac{106.4}{(h_1^2 - h_2^2)}$$

$A$ = cross sectional area of the bore of the capillary tube in square centrimetres $h_1$ and $h_2$ = heights of the molten polymer in the capillary tube after and before the readings, respectively.

The nitrogen pressure was corrected using the equation:

$$P = P^1 - \left(\frac{DH}{27.2}\right) \text{mm. of mercury}$$

where $P^1$ = pressure read on the manometer
$D$ = density of molten polymer in grs./cc.
$H$ = height in mm. of the polymer in the capillary tube above the surface of the molten mass.

The values obtained were—

| Pressure (mm. Hg.) | Corrected Pressure P (mms. Hg.) | C | Flow time Q. (secs.) | Calculated Viscosity (Poises) |
|---|---|---|---|---|
| 273 | 270 | 0.08088 | 112.2 | 2,440 |

A melt viscosity value of 2440 poises was obtained which was not significantly different from the value of 2460 poises obtained by a similar test on polymer containing no colouring matter, thus indicating little or no attack on the polymer by the colouring matter.

The colouring matter used should preferably be free from water and inorganic diluents. Organic diluents such as for example dextrin which decompose under the conditions of the spinning process are also undesirable.

As examples of classes of colouring matters which are especially suitable for use in the process there may be mentioned—

(1) Substituted aminoanthraquinones, for example 1:4-di-p-butylanilino - 5:8 - dihydroxyanthraquinone which may be obtained by condensing leuco 1:4:5:8 - tetrahydroxyanthraquinone with two molecular proportions of p-butylaniline, 1-amino - 2 - bromo-4-p-toluidinoanthraquinone which may be obtained by condensing 1-amino-2:4-dibromoanthraquinone with p-toluidine, 1-p-toluidino-4-hydroxyanthraquinone which may be obtained by condensing 1-hydroxy-4-halogenoanthraquinone with 1 molecular proportion of p-toluidine, 1-benzoylamino-4-(p-benzeneazoanilino)-2-methylanthraquinone, 1-amino-4-anilino-2-dodecyloxyanthraquinone and 1:4-bis-(6'-bromo-2'-methyl-4'-n-butylanilino)-anthraquinone.

(2) Vat dyestuffs of the indigo, thioindigo and anthraquinone series, for example Durindone Scarlet Y (Schultz Farbstoff Tabellen No. 1356), and 6:6' - dichloro - 4:4' - dimethylthioindigo (Matières Colorantes les Indigoides by M. Martinet published by Baillières et Fils, 1934, page 196), naphthathioindigo, 16:17-dimethoxydibenzanthrone and pyranthrone (Colour Index No. 1096). Other classes of organic colouring matters may of course be used provided that they pass the tests indicated above. For example there may be used phthalimide condensation products with compounds containing reactive methylene groups, such as the condensation product of phthalimide with 7-chloro-5-methyl-3-keto-2:3-dihydrobenz-1:4-thiazine.

Although acid dyestuffs in the form of the free acids or metallic salts in general do not satisfy the aforementioned test and are unsatisfactory for use in the process of our invention, we have found that some compounds derived from these acid dyestuffs satisfy the test and are eminently suitable for use in the process. For example the sodium salt of the acid dyestuff obtained by coupling diazotised 4-chloro-2-aminoanisole with 2-naphthol-6:8-disulphonic acid and converting the azo compound so obtained to the chromium complex by boiling it with aqueous chromium sulphate, is not itself suitable for use in the process. By reacting this compound in aqueous solution with the hydrochloride of the basic dyestuff, Rhodamine B, Colour Index 749, a compound of the basic dyestuff and the acid dyestuff is precipitated which is eminently suitable for colouring polyethylene terephthalate in bright red shades by the process of our invention.

If desired mixtures of dyestuffs may be used in the process.

It will be readily understood that although some dyestuffs may not have sufficient solubility in the polyethylene terephthalate to give very deep shades, they may nevertheless have sufficient solubility for the production of pale shades and such dyestuffs may be of value for use for pale shades and as shading colours for use with other dyestuffs.

In addition to the dyestuffs used in the process of our invention, other substances may be incorporated with the molten polyethylene terephthalate, for example the finely divided substances used in the process described in British Specification No. 504,714.

The polyethylene terephthalate used in the process of our invention may be made by any known process. The dyestuff may be incorporated into the molten polyethylene terephthalate either as the solid dyestuff, or in solution or suspension in a small quantity of polyethylene terephthalate, or in some medium which can be removed by evaporation or other means before the spinning process. Alternatively the dyestuff may be added to the solid polymer before melting. The polyethylene terephthalate containing the dyestuff in solution and if desired other substances in solution or suspension may be first formed into blocks, chips, rods or other shapes which may then be remelted in the spinning apparatus. Alternatively the molten polyethylene terephthalate containing the dyestuff in solution and, if desired, other substances in solution or suspension, may be spun without intermediate cooling, the solution of dyestuff in molten polyethylene terephthalate being made up in the spinning apparatus itself or in a separate vessel from which it can be transferred to the spinning apparatus.

For the spinning operation any suitable apparatus may be used, for example a rod spinning apparatus of the kind described in British Specification No. 527,532 or a grid-spinning apparatus of the kind described in British Specification No. 533,307.

The filaments can be subsequently drawn to as much as several times their original lengths. The drawing operation may be carried out on filaments which have been allowed fully to cool and solidify after their formation, or it may directly follow the formation of the filaments as one part of a continuous process. Any suitable apparatus and process may be used for the drawing. For instance, the filaments may be wound from one roller to another, the second roller rotating at a higher speed than the first roller, for example at a speed up to about 4 or 5 times that of the first roller.

The invention is illustrated but not limited by the following examples, in which the parts are expressed by weight.

Example 1

1 part of finely powdered 1:4-di-(p-butylanilino) - 5:8 - dihydroxyanthraquinone is well mixed with 100 parts of polyethylene terephthalate (intrinsic viscosity 0.68) in the form of chips. The mixture is dried by heating it at 160° C. under vacuum (5 mm.) for 18 hours when dry polyethylene terephthalate in the form of dark green chips is obtained. By examining a section of one or more of the chips it is seen that the colour has penetrated throughout the mass. The dark green chips are charged into a grid spinning apparatus heated to 270° C. and spun into a yarn having a bright green shade. Spinning is complete in 3 hours and there is no perceptible change in the shade of the yarn formed during the spinning operation. The spun yarn is stretched to 5.5 times its own length at a temperature of 180° C. The tensile strength of the fibres thus obtained is 5.6 gms. per denier at 13.4% elongation and the fibres are coloured a bright green shade of very high fastness to wet treatments and to light. A sample of the same polymer spun by the same process but in the absence of the dyestuff and subsequently stretched in the same way gives fibres of the same tensile strength as the above green coloured fibres.

Example 2

1 part of finely powdered 6:6'-dichloro-4:4'-dimethylthioindigo is well mixed with 100 parts of polyethylene terephthalate (intrinsic viscosity 0.68) in the form of chips. The mixture is dried by heating it at 160° C. under vacuum (5 mm.) for 18 hours, when dry polyethylene terephthalate in the form of scarlet chips is obtained. By examining sections of one or more of the chips, it is seen that the colour has penetrated through the mass. The scarlet chips are charged into a grid spinning apparatus heated to 270° C., and spun into a yarn having a bright scarlet shade. Spinning is complete in 3 hours and there is no perceptible change in the shade of the yarn formed during the spinning operation.

The spun yarn is stretched to 5.5 times its own length at a temperature of 180° C. The tensile strength of the fibres thus obtained is 5.3 gms. per denier at 9.3% elongation. The fibres are coloured a bright pink shade.

Example 3

Instead of the 1 part of dyestuff used in Example 1 there are used 0.30 part of 1:5-dibenzoylaminoanthraquinone, 0.20 part of 6-p-toluidino-3-methyl-anthropyridone and 0.23 part of 1:4-di - (p - butylanilino)-5:8-dihydroxyanthraquinone. An olive green yarn is obtained.

We claim:

1. A process for the production of coloured filaments and fibers from polyethylene terephthalate which comprises dissolving organic colouring matter in polyethylene terephthalate and thereafter spinning the polyethylene terephthalate, said organic colouring matter being stable at the spinning temperature.

2. Process according to claim 1 wherein there is used an organic colouring matter which under the conditions used in the spinning process, causes no appreciable degradation of the polyethylene terephthalate.

3. A process as claimed in claim 1 wherein the colouring matter is a vat dyestuff.

4. A process as claimed in claim 1 wherein the colouring matter is an aminoanthraquinone.

5. A process as claimed in claim 1 wherein the dissolution of the organic colouring matter is obtained by adding the same in solid form to molten polyethylene terephthalate.

6. A process as claimed in claim 1 wherein the dissolution of the organic colouring matter is obtained by adding the same in solid form to solid polyethylene terephthalate and thereafter melting the mixture.

7. A process as claimed in claim 1 wherein the dissolution of the organic colouring matter is obtained by adding the same to molten polyethylene terephthalate in solution in a removable medium and removing the medium prior to the spinning step.

8. A material from which coloured filaments and fibers may be spun comprising polyethylene terephthalate having dissolved therein an organic colouring matter which is stable at spinning temperature.

9. A material as claimed in claim 8 wherein said colouring matter is one which causes no appreciable degradation of the polyethylene terephthalate.

10. A material as claimed in claim 8 wherein the colouring matter is a vat dyestuff.

11. A material as claimed in claim 8 wherein said colouring matter is an aminoanthraquinone.

12. A spinning solution for producing coloured filaments and fibers comprising molten polyethylene terephthalate having dissolved therein an organic coloured matter which is stable at spinning temperature.

EDMUND WATERS.
LEONARD WOOD.

REFERENCES CITED

The following references are of record in the file of this patent:

UNITED STATES PATENTS

| Number | Name | Date |
|---|---|---|
| 2,105,519 | Bodell | Jan. 18, 1938 |

FOREIGN PATENTS

| Number | Country | Date |
|---|---|---|
| 609,944 | Great Britain | Oct. 8, 1948 |
| 609,948 | Great Britain | Oct. 8, 1948 |